Patented Nov. 12, 1940

2,221,027

UNITED STATES PATENT OFFICE 2,221,027

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application November 19, 1938, Serial No. 241,458

9 Claims. (Cl. 260—199)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particulary in connection with the coloration of cellulose acetate, a material to which the invention is especially adapted, it will be understood that it applies to the coloration of other organic derivatives of cellulose such as those just mentioned.

The azo dye compounds of our invention have the probable general formula:

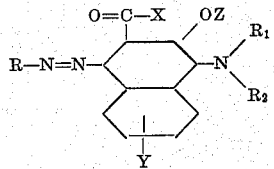

wherein R represents the residue of an aromatic nucleus, $R_1$ and $R_2$ each represents hydrogen, an alkyl group, an aryl group or a heterocyclic group, X represents OA, wherein A represents hydrogen, an alkyl group, an aryl group or a heterocyclic group or an amino group which may be substituted with an alkyl group, an aryl group or a heterocyclic group, Y represents hydrogen or a monovalent substituent such as a halogen atom, a hydroxyl group, an amino group, an alkylamino group, an alkoxy group, or a nitro group and Z represents hydrogen, an alkyl group, an aryl group or a heterocyclic group.

It will be understood that alkyl, as used herein, unless otherwise stated, includes not only unsubstituted alkyl groups, such as a methyl group, an ethyl group or a propyl group but also substituted alkyl groups such as β-hydroxyethyl, β,γ-hydroxypropyl, β-methoxyethyl or β-ethoxyethyl, for example. Illustrative of halogen may be mentioned chlorine, bromine and iodine. Similarly, illustrative alkoxy groups include methoxy, ethoxy and propoxy. As more fully illustrated hereinafter $R_1$, $R_2$, Y and Z may contain groups such as hydroxy, amino, —SO₃H, —OSO₃Na, —COOH and

for example. The aromatic nucleus R may be, for example, a benzene, naphthalene, anthracene, anthraquinone, phenanthrene or fluorene nucleus. These nuclei may be suitably substituted.

The azo dye compounds of our invention can be prepared by diazotizing a primary aromatic amine and coupling the diazonium compound obtained with a coupling compound having the general formula:

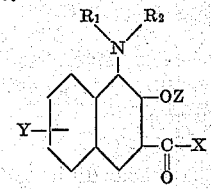

wherein R, $R_1$, X, Y and Z have the meaning previously assigned to them. No substituent which would prevent coupling should be present. To illustrate no substituent should be present in the position in which coupling would otherwise take place.

As previously indicated, the nuclear non-sulfonated aromatic azo dye compounds of our invention constitute valuable dyes for the coloration of organic derivatives of cellulose such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. Compounds in which the aromatic nucleus designated R contains a nuclear sulfonic acid group can likewise be prepared in known fashion. These compounds possess little or no utility for the coloration of organic derivatives of cellulose but can be employed to color textile materials such as wool and silk, yielding various shades thereon. For the dyeing of organic derivatives of cellulose such as cellulose acetate silk, nuclear non-sulfonated compounds wherein R is a phenyl residue are generally advantageous. Said phenyl residue may be substituted as clearly shown herein.

The following examples illustrate the preparation of the azo dye compounds of our invention.

Example 1

(A) 7.6 gm. of sodium nitrite are dissolved in 53 cc. of sulfuric acid (sp. gr. 1.84). After the addition, the solution is warmed to 70° and then cooled to 10–15°.

(B) 18.3 gm. of 2,4-dinitroaniline are dissolved in 220 cc. of hot acetic acid and then cooled to 10–15°. After the addition, the resulting solution is stirred for 30 minutes, allowed to stand for 1 hour and then 1 gm. of urea is added.

20.3 gm. of 1-amino-2-hydroxy-3-naphthoic acid are dissolved in a minimum amount of cold dilute (10%) hydrochloric acid. The diazo solution prepared as described is added with stirring. The mixture is then made neutral to Congo paper with sodium acetate. When coupling is complete the dye is filtered, washed, and dried.

Example 2

22.5 gm. of 3,5-dinitro-4-aminoacetophenone are diazotized as described above.

31.6 gm. of 1-glycerylamino-2-methoxy-3-β-hydroxyethylcarboxynaphthalene are dissolved in a minimum amount of acetic acid. To the well iced mixture is added the diazo solution prepared as described above. Coupling is completed by making the mixture neutral to Congo paper with sodium acetate or carbonate. Water is added and the dye is filtered, washed and dried.

Example 3

26.2 gm. of 2,4-dinitro-6-bromoaniline are diazotized as described in Example 1. 23 gm. of 1-dimethylamino-2-hydroxy-3-naphthamide are dissolved in the minimum amount of dilute hydrochloric acid. Ice is added and the diazo solution prepared as described is added slowly with stirring. Coupling is completed by making the mixture neutral to Congo paper with sodium bicarbonate. When coupling is complete the dye is filtered, washed, and dried.

Example 4

22.5 gm. of 4-amino-3,5-dinitroacetophenone are diazotized as described in Example 1.

32.4 gm. of 1-di-β-hdyroxyethylamino-2-methoxy-3-β-hydroxyethylnaphthamide are dissolved in the minimum amount of dilute hydrochloric acid and coupled as previously described.

If desired the dye may be treated in a suitable solvent with phosphorous oxychloride or derivative thereof or with chlorosulfonic acid to give water soluble blue dyes. One to three molecular equivalents of the desired acid chloride may be used.

Example 5

59.6 grams of

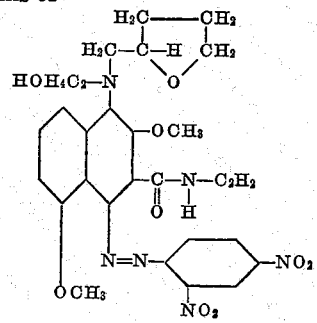

are placed in 400 cc. of tetrachloroethane and treated with 16.3 grams of C₂H₅—OPOCl₂. The reaction is completed by heating. When the reaction is complete the carbon tetrachloride is distilled off and the residue is treated with cold sodium carbonate. The dye is filtered and dried. The dye probably has the formula:

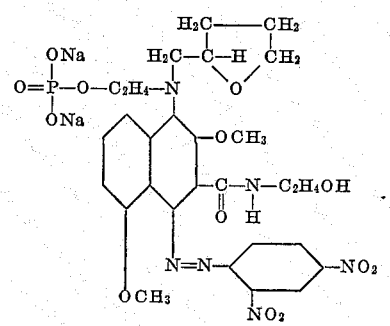

The following tabulation further illustrates the compounds included within the scope of our invention together with the color they produce on cellulose acetate silk. The compounds indicated below may be prepared by diazotizing the amines listed under the heading "Amine" and coupling with the compounds specified in the column entitled "Coupling component." The diazotization and coupling reaction may, for example, be carried out following the general procedure described in Examples 1 to 5, inclusive.

| Amine | Coupling component | Color on cellulose acetate silk |
|---|---|---|
| p-Nitroaniline | (1) 1-amino-2-hydroxy-naphthoic acid | Rubine. |
| Do | (2) 1-(N-glycerylamino)-8-chloro-2-methoxy-3-(β-hydroxyethyl carboxy)naphthalene | Do. |

| Amine | Coupling component | Color on cellulose acetate silk |
|---|---|---|
| p-Nitroaniline | (3) [naphthalene with N(C₂H₄OH)₂, O—C₂H₄—SO₃Na, and —C(O)—NH—C₂H₅ substituents] | Rubine. |
| Do | (4) [naphthalene with N(C₄H₉)(C₂H₄—O—SO₃Na), OH, and —C(O)—NH—cyclohexyl substituents] | Do. |
| Do | (5) [naphthalene with N(H₃CO—H₄C₂—O—P(=O)(ONa)—O—H₄C₂—)(—CH(CH₃)—CH(—O—)CH₂ morpholine-like group), OH, and —C(O)—NH—C₂H₄—OCH₃ substituents] | Do. |
| Do | (6) [naphthalene with N(CH₂—CH₂OH—CH₂—OCH₃)₂, OH, —C(O)—NH—CH(CH₃)—CH(—O—)CH₂, and OH substituents] | Do. |
| 2,4-dinitroaniline (F, Cl, Br) | Coupling component 1-6 above | Purple. |
| 2,4-dinitroaniline-6-(F, Cl, Br) aniline | do | Blue. |
| 2,4-dinitro-6-sulfoaniline | do | Do. |
| 2,4-dinitro-6-sulfoaniline methyl ester | do | Do. |
| 2,4-dinitro-6-alkoxyaniline | do | Do. |
| 2,4-dinitro-6-alkylaniline | do | Do. |
| 2,4-dinitro-α-naphthylamine | do | Do. |

In order that the preparation of the azo dye compounds of our invention may be clearly understood the preparation of the coupling compounds is indicated hereinafter. These coupling compounds which have the formula:

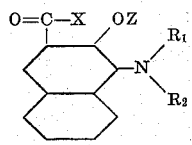

wherein $R_1$, $R_2$, X, Y and Z have the meaning previously given to them may be prepared by nitrosoating compounds having the formula:

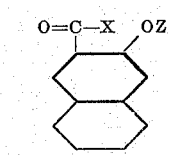

wherein X and Z have the meaning given them and hydrogenating the compounds so obtained in the presence of a suitable catalyst such as Raney nickel, copper chromite, etc. The amine compounds thus obtained may be alkylated, for example, in accordance with known alkylation methods, to obtain alkylated derivatives.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula:

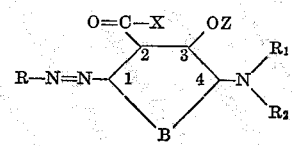

wherein R represents the residue of an aromatic nucleus, B represents the residue of an aryl nucleus of the benzene series containing but one benzene ring joined through adjacent carbon atoms to the 1 and 4 positions of the nucleus shown, $R_1$ and $R_2$ each represents a member selected from the group consisting of hydrogen, an alkyl group and a furyl group, X represents a member selected from the group consisting of an amino group, an alkylamino group, a phenylamino group, a furylamino group and an OA group (O being oxygen), wherein A represents a member selected from the group consisting of hydrogen and an alkyl group and Z represents a member selected from the group consisting of hydrogen and an alkyl group.

2. The azo dye compounds having the general formula:

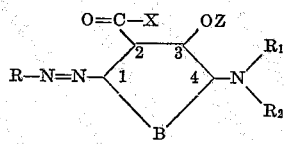

wherein R represents the residue of an aryl nucleus of the benzene series, containing but one benzene ring, B represents the residue of an aryl nucleus of the benzene series containing but one benzene ring joined through adjacent carbon atoms to the 1 and 4 positions of the nucleus shown, $R_1$ and $R_2$ each represents a member selected from the group consisting of hydrogen, an alkyl group and a furyl group, X represents a member selected from the group consisting of an amino group, an alkylamino group, a phenylamino group, a furylamino group and an OA group (O being oxygen), wherein A represents a member selected from the group consisting of hydrogen and an alkyl group and Z represents a member selected from the group consisting of hydrogen and an alkyl group.

3. The azo dye compounds having the general formula:

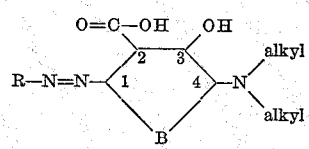

wherein R represents the residue of an aromatic nucleus and B represents the residue of an aryl nucleus of the benzene series containing but one benzene ring joined through adjacent carbon atoms to the 1 and 4 positions of the nucleus shown.

4. The azo dye compounds having the general formula:

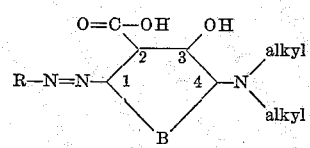

wherein R represents the residue of an aryl nucleus of the benzene series containing but one benzene ring and B represents the residue of an aryl nucleus of the benzene series containing but one benzene ring joined through adjacent carbon atoms to the 1 and 4 positions of the nucleus shown.

5. The azo dye compounds having the general formula:

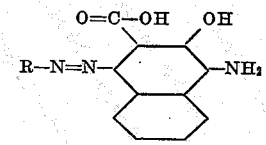

wherein R represents the residue of an aryl nucleus of the benzene series containing but one benzene ring.

6. Material made of or containing an organic derivative of cellulose colored with a nuclear non-sulfonated azo dye compound having the general formula:

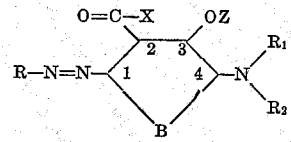

wherein R represents the residue of an aromatic nucleus, B represents the residue of an aryl nuclues of the benzene series containing but one benzene ring joined through adjacent carbon atoms to the 1 and 4 positions of the nucleus shown, $R_1$ and $R_2$ each represents a member selected from the group consisting of hydrogen, an alkyl group and a furyl group, X represents a member selected from the group consisting of an amino group, an alkylamino group, a phenylamino group, a furylamino group and an OA group (O being oxygen), wherein A represents a member selected from the group consisting of hydrogen and an alkyl group and Z represents a member selected from the group consisting of hydrogen and an alkyl group.

7. Material made of or containing an organic derivative of cellulose colored with a nuclear non-sulfonated azo dye compound having the general formula:

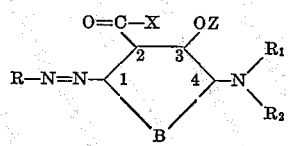

wherein R represents the residue of an aryl nucleus of the benzene series containing but one benzene ring, B represents the residue of an aryl nucleus of the benzene series containing but one benzene ring joined through adjacent carbon atoms to the 1 and 4 positions of the nucleus shown, $R_1$ and $R_2$ each represents a member selected from the group consisting of hydrogen, an alkyl group and a furyl group, X represents a member selected from the group consisting of an amino group, an alkylamino group, a phenylamino group, a furylamino group and an OA group (O being oxygen), wherein A represents a member selected from the group consisting of hydrogen and an alkyl group and Z represents a member selected from the group consisting of hydrogen and an alkyl group.

8. A cellulose acetate colored with a nuclear non-sulfonated azo dye compound having the general formula:

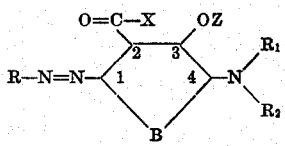

wherein R represents the residue of an aromatic nucleus, B represents the residue of an aryl nucleus of the benzene series containing but one benzene ring joined through adjacent carbon atoms to the 1 and 4 positions of the nucleus shown, $R_1$ and $R_2$ each represents a member selected from the group consisting of hydrogen, an alkyl group and a furyl group, X represents a member selected from the group consisting of an amino group, an alkylamino group, a phenylamino group, a furylamino group and an OA group (O being oxygen), wherein A represents a member selected from the group consisting of hydrogen and an alkyl group and Z represents a member selected from the group consisting of hydrogen and an alkyl group.

9. A cellulose acetate colored with a nuclear non-sulfonated azo dye compound having the general formula:

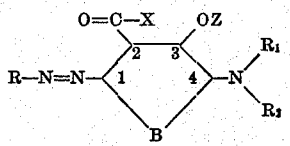

wherein R represents the residue of an aryl nucleus of the benzene series, containing but one benzene ring, B represents the residue of an aryl nucleus of the benzene series containing but one benzene ring joined through adjacent carbon atoms to the 1 and 4 positions of the nucleus shown, $R_1$ and $R_2$ each represents a member selected from the group consisting of hydrogen, an alkyl group and a furyl group, X represents a member selected from the group consisting of an amino group, an alkylamino group, a phenylamino group, a furylamino group and an OA group (O being oxygen), wherein A represents a member selected from the group consisting of hydrogen and an alkyl group and Z represents a member selected from the group consisting of hydrogen and an alkyl group.

JAMES G. McNALLY.
JOSEPH B. DICKEY.